United States Patent
Hashimoto et al.

(10) Patent No.: US 10,369,733 B2
(45) Date of Patent: Aug. 6, 2019

(54) SYNTHETIC RESIN MOLDING AND MOLDING METHOD THEREFOR

(71) Applicant: KASAI KOGYO CO., LTD., Kanagawa (JP)

(72) Inventors: Shinya Hashimoto, Ebina (JP); Hiroki Komatsuzaki, Kanagawa (JP)

(73) Assignee: KASAI KOGYO CO., LTD., Kanagawa (JP)

( * ) Notice: Subject to any disclaimer, the term of this patent is extended or adjusted under 35 U.S.C. 154(b) by 355 days.

(21) Appl. No.: 15/507,340

(22) PCT Filed: Jun. 19, 2015

(86) PCT No.: PCT/JP2015/003078
§ 371 (c)(1),
(2) Date: Feb. 28, 2017

(87) PCT Pub. No.: WO2016/084269
PCT Pub. Date: Jun. 2, 2016

(65) Prior Publication Data
US 2017/0305051 A1   Oct. 26, 2017

(30) Foreign Application Priority Data
Nov. 25, 2014  (JP) ................................. 2014-237637

(51) Int. Cl.
*B29C 45/00*  (2006.01)
*B29C 45/37*  (2006.01)
(Continued)

(52) U.S. Cl.
CPC .......... *B29C 45/37* (2013.01); *B29C 45/0025* (2013.01); *B29C 45/16* (2013.01);
(Continued)

(58) Field of Classification Search
CPC .............................. B29C 45/0025; B29C 45/37
See application file for complete search history.

(56) References Cited

U.S. PATENT DOCUMENTS

2001/0014389 A1  8/2001  Mizutani
2006/0216479 A1  9/2006  Cowelchuk et al.

FOREIGN PATENT DOCUMENTS

DE   102006013230 A1   10/2006
JP   H07-304071 A   11/1995
(Continued)

OTHER PUBLICATIONS

Office Action dated Nov. 20, 2017 in a corresponding German application No. 112015005294.1.
(Continued)

*Primary Examiner* — Austin Murata
(74) *Attorney, Agent, or Firm* — United IP Counselors, LLC

(57) ABSTRACT

A molding method for a synthetic resin molding that includes a molding body, a bent portion, and a flange. The bent portion and the flange are continuous in a longitudinal direction of the side edge. The flange includes a wide portion and a narrow portion. The molding method for the synthetic resin molding includes arranging a gate at a position corresponding to an end of one side of the flange in a longitudinal direction, setting a relationship $S1 \leq S2$, where $S1$ is a cross-sectional area of the wide portion of the flange, and $S2$ is a cross-sectional area of the narrow portion of the flange adjacent to and downstream from the wide portion in a flow of molten resin, and performing injection molding using a colored resin material containing a luster agent kneaded in the material.

10 Claims, 2 Drawing Sheets

(51) Int. Cl.
*B29C 45/16* (2006.01)
*B29C 45/17* (2006.01)
*B29C 45/26* (2006.01)
B29C 45/28 (2006.01)

(52) U.S. Cl.
CPC ...... *B29C 45/1704* (2013.01); *B29C 45/2602* (2013.01); *B29C 2045/0027* (2013.01); *B29C 2045/1728* (2013.01); *B29C 2045/2882* (2013.01)

(56) References Cited

FOREIGN PATENT DOCUMENTS

| JP | H10-100187 A | 4/1998 |
| JP | 2011-083986 A | 4/2011 |
| JP | 2011-146227 A | 7/2011 |
| JP | 2012-206467 A | 10/2012 |

OTHER PUBLICATIONS

International Search Report for International Application No. PCT/JP2015/003078 dated Aug. 4, 2015, Japan.

SYNTHETIC RESIN MOLDING AND MOLDING METHOD THEREFOR

CROSS-REFERENCE TO RELATED APPLICATIONS

This application is a National Stage Entry application of PCT International Application No. PCT/JP2015/003078, filed on Jun. 19, 2015, which claims the priority benefit of Japanese Patent Application No. 2014-237637, filed on Nov. 25, 2014, the entire contents of both of which are hereby incorporated by reference.

BACKGROUND

1. Technical Field

The present invention relates to a synthetic resin molding used as an automotive interior decorative component, such as an automotive trim, and a molding method for the synthetic resin molding.

2. Description of the Background

Synthetic resin moldings used as automotive interior decorative components may be injection-molded pieces with a high quality appearance of metallic luster using a metallic colored resin material, which is a resin material into which a luster agent containing metallic powder, such as aluminum powder, has been kneaded.

A synthetic resin molding formed by injection molding can typically have weld lines, or flow lines, resulting from a disturbed flow of the molten resin. For a molding formed using a metallic colored resin material, in particular, a disturbed flow of the molten resin can disturb the orientation of the luster agent. This destabilizes the color tones and cannot produce intended design effects.

Techniques have been known to prevent such weld lines in synthetic resin moldings formed by injection molding. One such technique described in, for example, Japanese Unexamined Patent Application Publication No. 7-304071 (hereinafter referred to as "Patent Literature 1") allows the resin injected through a plurality of gates to flow uniformly along a continuous thin portion on a back surface portion of a molding corresponding to the gates.

BRIEF SUMMARY

A synthetic resin molding such as an automotive trim that is mounted to cover the surface of a counterpart panel has a bent portion bending toward its back surface at one side edge of its plate-like trim body, and a flange protruding laterally from the bent portion. The bent portion and the flange are continuous with each other along the length of the side edge. The flange serves as a mounting member with which the molding is mounted onto the counterpart panel.

The flange has an irregular width, and includes a wide portion and narrow portions, in correspondence with the contours of the counterpart panel. This allows fitting between the corresponding surfaces overlapping each other.

In this manner, the plate-like automotive trim has a complex and irregular outer shape with the flange including the wide and narrow portions. The flange is continuous with the bent portion arranged at one side edge. In this structure, the molten resin in the flange can flow in a disturbed manner, and can affect the flow in the trim body. This can create weld lines on the design surface of the trim body.

For a molding formed using a metallic colored resin material, in particular, a disturbed flow of the molten resin can disturb the orientation of the luster agent, and can greatly degrade the design effects of the design surface. This is unavoidable even with the technique described in Patent Literature 1.

In one aspect of the present invention, even if a molding body includes a bent portion arranged on its side edge and bending toward its back surface, and a flange continuous with the bent portion and including wide and narrow portions, that is the flange has a complex and irregularly shape, it can reduce a disturbed flow of molten resin at the side edge during injection molding. This allows the design surface of the molding body to have aesthetic appearance in the synthetic resin molding including the molding body.

Another aspect of the present invention is directed to the synthetic resin molding obtained with the molding method.

A molding method for a synthetic resin molding according to one aspect of the present invention is a molding method for a synthetic resin molding including a molding body, a bent portion arranged on a side edge of the molding body and bending toward a back surface of the molding body, and a flange protruding laterally from the bent portion. The bent portion and the flange are continuous in a longitudinal direction of the side edge. The flange includes a wide portion and a narrow portion protruding by a smaller amount than the wide portion. The method includes arranging a gate at a position corresponding to an end of one side of the flange in a longitudinal direction, setting a relationship $S1 \leq S2$, where $S1$ is a cross-sectional area of the wide portion of the flange, and $S2$ is a cross-sectional area of the narrow portion of the flange that is adjacent to and downstream from the wide portion in a flow of molten resin, and performing injection molding using a colored resin material containing a luster agent kneaded in the material.

A synthetic resin molding according to another aspect of the present invention includes a molding body, a bent portion arranged on a side edge of the molding body and bending toward a back surface of the molding body, and a flange protruding laterally from the bent portion. The bent portion and the flange are continuous in a longitudinal direction of the side edge. The flange includes a wide portion and a narrow portion protruding by a smaller amount than the wide portion. The synthetic resin molding is an injection-molded piece formed using a gate arranged at a position corresponding to an end of one side of the flange in a longitudinal direction, and using a colored resin material containing a luster agent kneaded in the material. The synthetic resin molding satisfies a relationship $S1 \leq S2$, where $S1$ is a cross-sectional area of the wide portion of the flange, and $S2$ is a cross-sectional area of the narrow portion of the flange that is adjacent to and downstream from the wide portion in a flow of molten resin.

The synthetic resin molding and the molding method according to embodiments of the present invention allow uniform flow of a colored resin material containing a luster agent kneaded in the material, by allowing the large cross-sectional area $S2$ to prevent the molten resin from narrowing as the resin flows from a cavity area corresponding to the wide portion of the flange into a cavity area downstream in the molten resin flow corresponding to the narrow portion of the flange when the molten colored resin material is injected through a gate arranged at a position corresponding to an end of one side of the flange in the longitudinal direction during injection molding of the synthetic resin molding.

This structure prevents the molten resin around the wide portion of the flange from flowing toward the molding body in a disturbed manner and affecting the flow in the molding body.

This structure prevents the orientation of the luster agent in the colored resin material from being disturbed by the disturbed flow of the molten resin in the molding body, and allows the design surface of the molding body to have aesthetic appearance, and enhances the design effects of the synthetic rein molding.

DETAILED DESCRIPTION

Embodiments of the present invention will be described with reference to the drawings.

Figure 1:
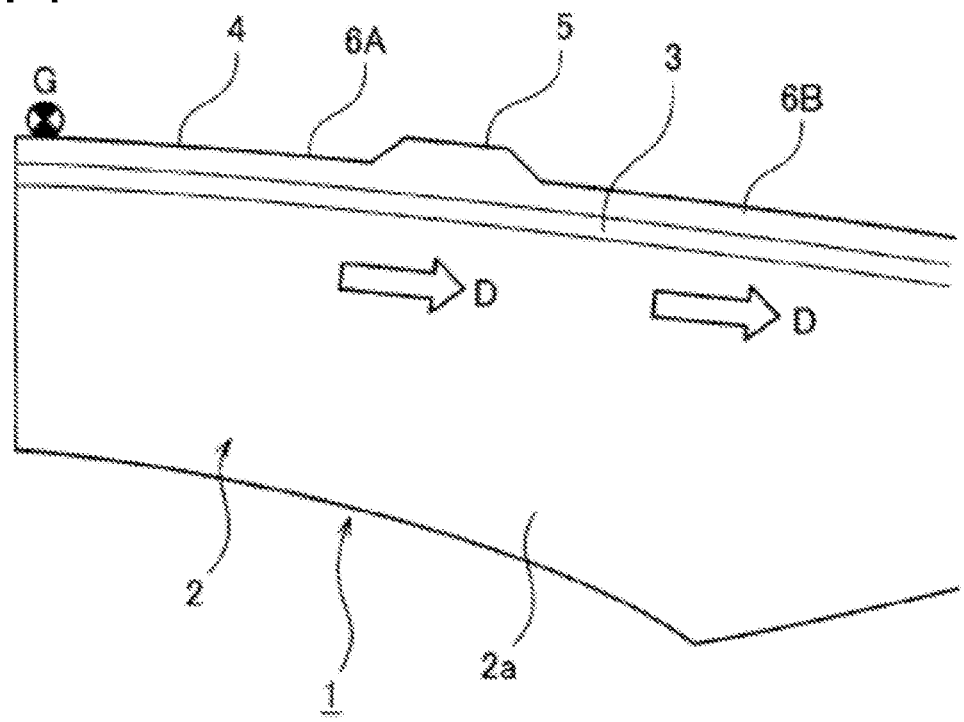
FIG. 1 is an explanatory side view of a synthetic resin molding according to a first embodiment of the present invention.

FIG. 1 shows a decorative plate 1 that is used as an armrest of an automotive trim, which is a synthetic resin molding according to one embodiment of the present invention. The decorative plate 1 is injection-molded into an intended shape with a mold using an appropriate synthetic resin material. The decorative plate 1 is used as an interior decorative component for decorating a side surface of an armrest (not shown) (hereafter referred to as a counterpart).

In the present embodiment, the decorative plate 1 is molded with a mold using a metallic colored resin material, which is a resin material into which a luster agent containing metal powder, such as aluminum powder, has been kneaded. A plate body 2 for covering the side surface of the counterpart is shaped into a plate with an intended thickness to develop high quality metallic luster to the surface.

Figure 2:
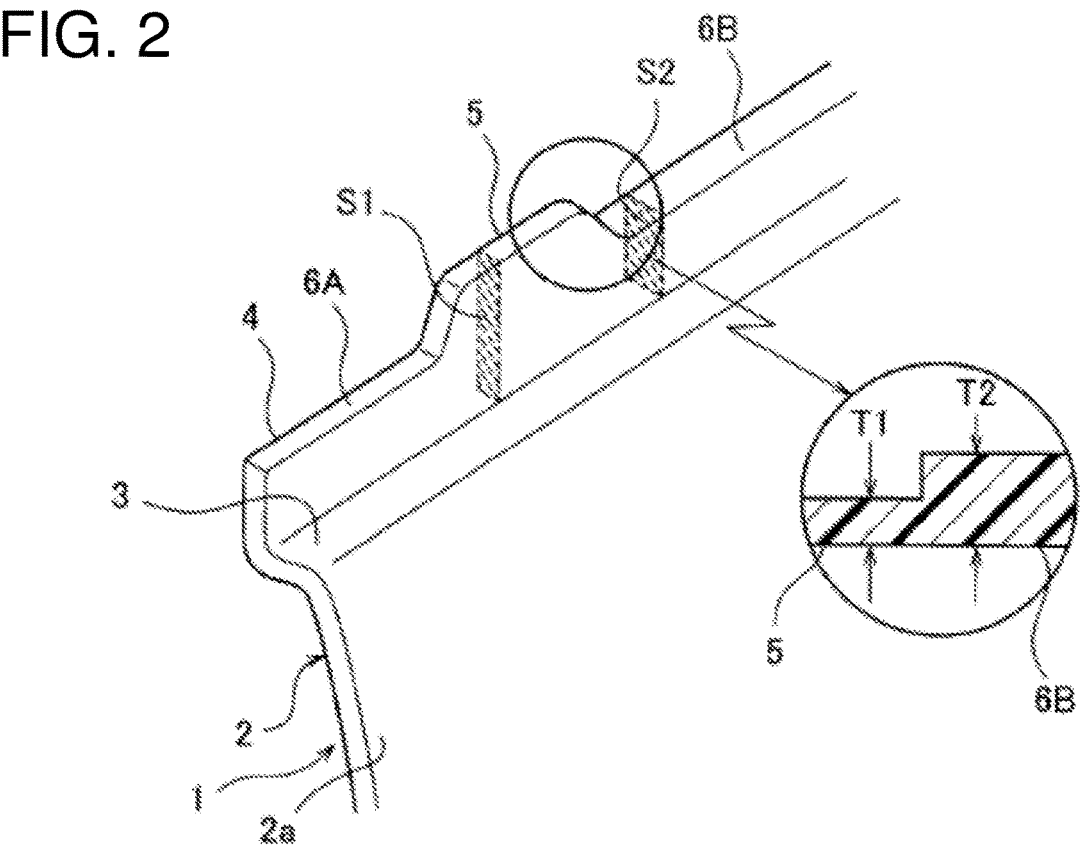
FIG. 2 is an explanatory enlarged perspective view of the synthetic resin molding shown in FIG. 1 showing its main components.

As shown in FIG. 2 as well, the plate body 2 has, at its one side edge such as its upper edge, a bent portion 3 and a flange 4. The bent portion 3 bends toward the back surface of the plate body 2. The flange 4 protrudes upward from the bent portion 3. The bent portion 3 and the flange 4 are continuous in the longitudinal direction. The flange 4 serves as a mounting member with which the molding is mounted onto the counterpart.

The flange 4 includes a wide portion 5, which protrudes by a larger amount, and narrow portions 6A and 6B, in correspondence with the contours of the counterpart. This allows fitting between the corresponding surfaces engaging with each other.

When this decorative plate 1 is formed by injection molding, the gate of the mold (not shown) is positioned as indicated by letter G in FIG. 1, which corresponds to a predetermined position at an end of one side of the flange 4 in the longitudinal direction, to prevent a gate mark from locating on a design surface 2a of the plate body 2.

During injection molding, the molten resin material injected from the gate position G flows in the cavity of the mold from the area corresponding to the flange 4 toward the areas corresponding to the bent portion 3 and the plate body 2 while spreading across the plate surface.

As described above, the plate body 2 has, at its side edge, the bent portion 3, and the flange 4 extending linearly from the bent portion 3. The flange 4 has the irregular shape including both the wide portion 5 and the narrow portions 6A and 6B. The flow of the molten resin narrows as the resin flows from a cavity area corresponding to the wide portion 5 into a cavity area corresponding to the adjacent narrow portion 6B of the flange 4 downstream in the flow of the molten resin.

As a result, the molten resin injected from the gate position G can flow in a disturbed manner around the boundary area between the wide portion 5 and the downstream narrow portion 6B. The disturbed flow can cause a portion of the molten resin flowing in the cavity area corresponding to the wide portion 5 to overflow obliquely toward the cavity area corresponding to the plate body 2. This can change the direction of the main stream of the molten resin in the cavity area corresponding to the plate body 2.

As shown in FIG. 2 in the present embodiment, the molding satisfies the relationship $S1 \leq S2$, where $S1$ is the cross-sectional area of the wide portion 5 of the flange 4, and $S2$ is the cross-sectional area of the adjacent narrow portion 6B of the flange 4 downstream in the flow of the molten resin in the wide portion 5.

In the present embodiment, the plate thickness of the narrow portion 6B downstream in the flow of the molten resin increases from the plate thickness $T1$ of the adjacent wide portion 5 in the flange 4 to the thickness $T2$ in the direction toward the back surface to satisfy the above relationship between the cross-sectional areas $S1 \leq S2$.

When the decorative plate 1 is formed by injection molding, a molten metallic colored resin material is injected from the gate position G, which corresponds to a position at an end of one side of the flange 4 in the longitudinal direction. As described above, the injected molten metallic colored resin material flows into the cavity of the mold from the area corresponding to the flange 4 toward the areas corresponding to the bent portion 3 and the plate body 2 while spreading across the plate surface.

The molten resin material flowing in the longitudinal direction in the cavity area corresponding to the flange 4 increases from the cavity area corresponding to the narrow portion 6A toward the cavity area corresponding to the wide portion 5, and then usually narrows at the junction with the cavity area corresponding to the downstream narrow portion 6B as described above. This tends to cause the molten resin to overflow into the main stream in the cavity area corresponding to the plate body 2.

In the present embodiment, the cross-sectional area $S1$ of the wide portion 5 of the flange 4 and the cross-sectional area $S2$ of the downstream narrow portion 6B satisfy the relationship $S1 \leq S2$. This allows the molten resin to flow substantially uniformly and smoothly from the cavity area corresponding to the wide portion 5 to the cavity area corresponding to the downstream narrow portion 6B.

This prevents a portion of the molten resin flowing into the cavity area corresponding to the wide portion 5 from overflowing obliquely toward the cavity area corresponding to the plate body 2 and causing a disturbed flow of the molten resin, which can affect the flow in the plate body 2.

This structure thus allows the luster agent to be orientated downstream in the molten resin flow substantially uniformly from the gate position G as indicated by the arrow D in FIG. 1.

This structure prevents the orientation of the luster agent in the colored resin material from being disturbed by the disturbed flow of the molten resin in the plate body 2, and allows the design surface 2a of the plate body 2 to have aesthetic appearance, and enhances the design effects of the decorative plate 1.

Figure 3:
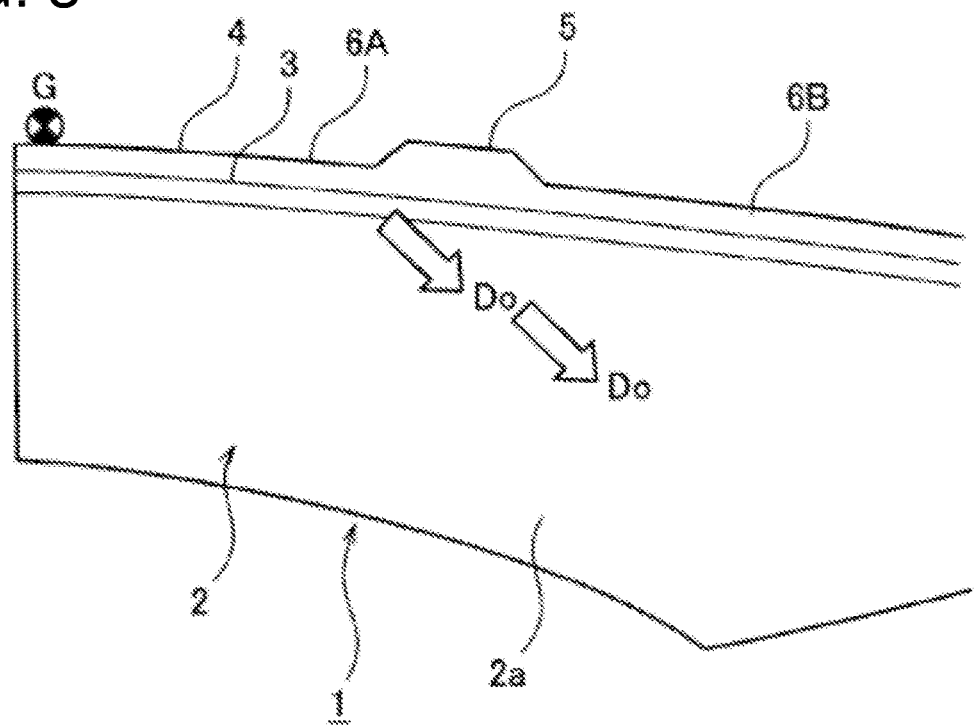
FIG. 3 is an explanatory side view of a synthetic resin molding according to a comparative example shown in the same manner as in FIG. 1.

FIG. 3 is a diagram showing a comparative example of the present embodiment. In the comparative example, the wide portion 5 of the flange 4 and the downstream narrow portion 6B in the flow of the molten resin have substantially the same thickness.

The structure of the comparative example narrows the molten resin flow from the cavity area corresponding to the wide portion 5 of the flange 4 into the cavity area corresponding to the downstream narrow portion 6B adjacent to the wide portion 5 in the molten resin flow during injection molding.

As a result, the flow of the molten resin injected from the gate position G can be disturbed around the boundary area between the wide portion 5 and the downstream narrow portion 6B. The disturbed flow can cause a portion of the molten resin flowing in the cavity area corresponding to the wide portion 5 to overflow obliquely toward the cavity area corresponding to the plate body 2. This tends to change the direction of the main stream of the molten resin in the cavity area corresponding to the plate body 2.

Figure 4:
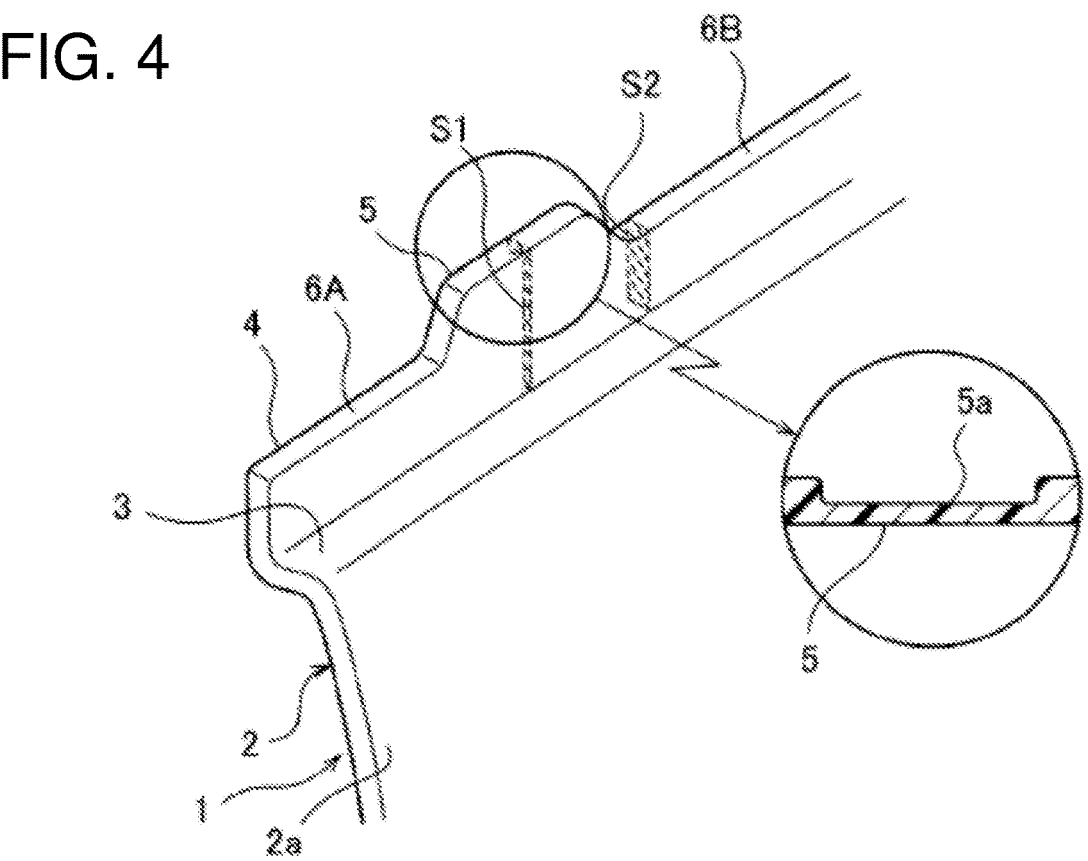
FIG. 4 is an explanatory perspective view of a synthetic resin molding according to a second embodiment of the present invention shown in the same manner as in FIG. 2.

For the molding formed using the metallic colored resin material, in particular, the luster agent flows obliquely from the bent portion 3 toward the plate body 2 as indicated by the arrow $D_0$ in FIG. 4 to create a weld line in the boundary area between the wide portion 5 and the downstream narrow portion 6B in the molten resin flow, and disturbs the orientation of the luster agent. This can cause irregular orientation of the luster agent at the design surface 2a and can degrade the color tones and luster.

In the present embodiment, as described above, the orientation of the luster agent is uniform without being disturbed in the cavity area corresponding to the wide portion 5. The design surface 2a of the plate body 2 can have aesthetic appearance, and enhance the design effects.

Although the downstream narrow portion 6B adjacent to the wide portion 5 of the flange 4 in the molten resin flow has the plate thickness T1 that is larger than the plate thickness T1 of the wide portion 5 in the present embodiment, the wide portion 5 may protrude by a smaller amount, and the narrow portion 6B may have a smaller thickness.

FIG. 4 is a diagram showing a second embodiment of the present invention. In the second embodiment, the wide portion 5 of the flange 4 has a recess 5a on its back surface to allow the cross-sectional areas described above to satisfy the relationship S1≤S2.

The structure according to the second embodiment also satisfies the relationship S1≤S2, where S1 is the cross-sectional area of the wide portion 5 of the flange 4, and S2 is the cross-sectional area of the downstream narrow portion 6B. This allows the molten resin to flow uniformly and smoothly from the cavity area corresponding to the wide portion 5 to the cavity area corresponding to the downstream narrow portion 6B during injection molding. As indicated by the arrow D in FIG. 1, the luster agent is orientated downstream in the molten resin flow substantially uniformly from the gate position G.

This prevents a portion of the molten resin flowing the cavity area corresponding to the wide portion 5 from overflowing obliquely toward the cavity area corresponding to the plate body 2 and causing a disturbed flow of the molten resin, which can affect, the flow in the plate body 2.

This structure prevents the orientation of the luster agent in the colored resin material from being disturbed by the disturbed flow of the molten resin in the plate body 2, and allows the design surface 2a of the plate body 2 to have aesthetic appearance, and enhances the design effects of the decorative plate 1.

In the structure according to the second embodiment, the flange 4 can have no protrusion with a different thickness on its back surface, and thus can be flat. This improves the easiness of surface fitting with the counterpart.

Although the decorative plate 1 used as an armrest of an automotive trim is described as an example of the synthetic resin molding according to the present embodiment, the synthetic resin molding may be any of other various synthetic resin components, in addition to an automotive trim.

The resin material may not be a metallic colored resin material, and may be a general-purpose resin material containing no luster agent to produce the same advantageous effects as described above.

REFERENCE SIGNS LIST 1 decorative plate (synthetic resin molding)
2 plate body (molding body)
3 bent portion
4 flange
5 wide portion
6A narrow portion
6B narrow portion (adjacent narrow portion downstream from wide portion)
G gate position
D orientation direction of luster agent
S1 cross-sectional area of wide portion
S2 cross-sectional area of adjacent narrow portion downstream from wide portion

The invention claimed is:

1. A molding method for a synthetic resin molding, the method comprising:
preparing a mold configured to form the synthetic resin molding, the mold including
a molding body having a side edge,
a bent portion arranged on the side edge and bending in a first direction, and a flange extending from the bent portion in a second direction orthogonal to the first direction, the flange including a wide portion having a cross-sectional area S1,
a first narrow portion having a shorter length in the second direction than the wide portion, and a second narrow portion having a shorter length in the second direction than the wide portion, the second narrow portion having a cross-sectional area S2 equal to or larger than the cross-sectional area S1, the wide portion being arranged between the first narrow portion and the second narrow portion, and
a gate at a position corresponding to an end of the first narrow portion; and
injecting a colored resin material from the gate into the mold, the colored resin material containing a luster agent kneaded in the material.

2. The molding method for the synthetic resin molding according to claim 1, wherein the second narrow portion has a larger thickness than the wide portion, and the second narrow portion protrudes in the first direction by a larger amount than the wide portion.

3. The molding method for the synthetic resin molding according to claim 1, wherein the length of the wide portion in the second direction is adjusted to allow the cross-sectional area S2 of the second narrow portion to be equal to or larger than the cross-sectional area S1 of the wide portion.

4. The molding method for the synthetic resin molding according to claim 2, wherein the length of the wide portion in the second direction is adjusted to allow the cross-sectional area S2 of the second narrow portion to be equal to or larger than the cross-sectional area S1 of the wide portion.

5. The molding method for the synthetic resin molding according to claim 1, wherein the wide portion has a recess on a surface of the wide portion in the first direction.

6. A synthetic resin molding, comprising:
a molding body having a side edge;
a bent portion arranged on the side edge and bending in a first direction; and
a flange extending from the bent portion in a second direction orthogonal to the first direction,
the flange including a wide portion having a cross-sectional area S1, a first narrow portion having a shorter length in the second direction than the wide portion, and a second narrow portion having a shorter length in the second direction than the wide portion,
the second narrow portion having a cross-sectional area S2 equal to or larger than the cross-sectional area S1, the wide portion being arranged between the first narrow portion and the second narrow portion.

7. The synthetic resin molding according to claim 6, wherein the second narrow portion has a larger thickness than the wide portion, and the second narrow portion protrudes in the first direction by a larger amount than the wide portion.

8. The synthetic resin molding according to claim 6, wherein the length of the wide portion in the second direction is adjusted to allow the cross-sectional area S2 of the second narrow portion to be equal to or larger than the cross-sectional area S1 of the wide portion.

9. The synthetic resin molding according to claim 7, wherein the length of the wide portion in the second direction is adjusted to allow the cross-sectional area S2 of the second narrow portion to be equal to or larger than the cross-sectional area S1 of the wide portion.

10. The synthetic resin molding according to claim 6, wherein the wide portion has a recess on a surface of the wide portion in the first direction.

* * * * *